United States Patent [19]

Akerberg

[11] Patent Number: 4,759,022
[45] Date of Patent: Jul. 19, 1988

[54] METHOD AND RECEIVER FOR RECEIVING MESSAGES SENT BY RADIO

[75] Inventor: Dag E. Åkerberg, Järfälla, Sweden

[73] Assignee: Telefonaktiebolaget LM Ericsson, Stockholm, Sweden

[21] Appl. No.: 887,093
[22] PCT Filed: Nov. 18, 1985
[86] PCT No.: PCT/SE85/00463
  § 371 Date: Jun. 30, 1986
  § 102(e) Date: Jun. 30, 1986
[87] PCT Pub. No.: WO86/03317
  PCT Pub. Date: Jun. 5, 1986

[30] Foreign Application Priority Data

Nov. 26, 1984 [SE] Sweden ............................ 8405958

[51] Int. Cl.⁴ ............................................. G06F 11/08
[52] U.S. Cl. ......................................... 371/69; 371/67; 371/53
[58] Field of Search ............... 371/69, 22, 31, 32, 371/53, 57, 67; 455/32, 38; 340/825.44

[56] References Cited

U.S. PATENT DOCUMENTS 3,732,541 5/1973 Neubauer .
3,781,794 12/1973 Morris .

Primary Examiner—Jerry Smith
Assistant Examiner—Robert W. Beausoliel
Attorney, Agent, or Firm—Roberts, Spiecens & Cohen

[57] ABSTRACT

In a method of receiving messages transmitted by radio in the form of coded characters, there is included storing a message in blocks together with error indications pertaining to the same, storing the same repeated messages in a register, and then combining a final version of the message from the blocks associated with the stored messages and containing the least number of errors. For guidance in the combination of blocks from different messages, there is an identity code inserted in each message. There are further included inserting, and searching for, characters in the messages pertaining to repetititon of the messages, the number of blocks in the messages and joining several messages into a continuous message. A receiver for carrying out the method contains a receiver aerial, a radio section, a demodulator, a decoder for the receiver's address, and a signal processor, which in turn contains a register for a message, a message memory for one or more messages, an error detector, the indications from which are also stored in the register, and a combination logic for combining a final version of the message from associated blocks containing the least number of errors.

6 Claims, 2 Drawing Sheets

METHOD AND RECEIVER FOR RECEIVING MESSAGES SENT BY RADIO

FIELD OF INVENTION

The invention relates to a method and a receiver for receiving messages sent by radio.

BACKGROUND

The state of the art with regard to radio reception and receivers, particularly with regrad to receivers for personnel location, is described inter alia in Patent Application GB No. 2101779A, published in January 1983. Therein is discussed a personnel locator adapted for receiving calls sent by radio and for receiving and storing a plurality of messages and for displaying one message at a time in a display window. The received message is compared with each of the already stored messages and is stored in the memory of the receiver only if it differs from all of the messages already stored. With the intention that the probability should be increased that the message is properly received, it is sent repeatedly, but the mentioned comparison prevents it being stored more than once.

A weakness in the thus described personnel locator is that if a character in one of the received messages has been received in a distorted state, the comparison cannot shown that the same message has been received, and different versions of the same message will be stored twice and possibly several times.

In addition to the above-mentioned application, an example of the method of sending and receiving personnel locator calls is described in: "Final Report of the British Post Office Code Standardisation Advisory Group (POCSAG)", London 1978.

SUMMARY OF INVENTION

It is an object of the invention to provide an improved method for receiving messages sent by radio and an improved receiver relating to this method. The invention is also preferably, but not solely, intended for application to receivers for personnel location.

It is characteristic of the invention that instead of comparing a message in its entirety with previously received messages, parts of messages or so-called blocks are put together, these being received error-free as far as possible. There are control bits in each block, with the aid of which it is possible to determine whether the received and temporarily stored block is error-free or erroneous. When the message is received for the second time, it is once again determined for each of the blocks whether it is error-free or erroneous. A final version of the message is put together from one block in each pair of blocks which is error-free. If neither of the blocks in a pair is error-free, this is accomplished from the block containing the least number of errors.

Added control bits may be alternatively used for correcting errors in the received blocks. Methods and apparatus for discovering and correcting errors with the aid of added control bits are known in the prior art and thus need not be described in detail.

As mentioned above, it is known in the prior art to increase the probability of a message being transmitted error-free, by repeating a message. In the message provided in accordance with the invention, the increase in probability for an error-free message that a repetition gives is also utilized, and this probability is further increased by the message being divided into a plurality of blocks, each of which is thus considerably shorter than the entire message. Messages to be received in the receiver begin with the receiver's address code; the receiver is adapted solely to receive messages containing its own address code.

The method described so far is already applicable when the final version of a message is to be put together from a single stored message and the same message has been received a second time. In a development of the invention, a plurality of messages is stored in the receiver, and when one of these is received for the second time there is the problem of finding out with which of the stored messages the latter shall be put together. In accordance with the invention, this is solved such that an introductory block is inserted in each message after the address code, there being included in this block a special identity code for each message, to be stored together with the messages, although avoiding the previously mentioned disadvantages occurring with a comparison of messages.

In still further developments of the method, there are included one or more of a variety of procedural steps. These include putting together a message block with a previous message's block provided that the latest received message contains a character with the significance that the message is a repetition of a previous one, not terminating the reception of a message until after reception of the number of blocks stated in the message, and marking every message which is to be joined to a message of extraordinary length with a character signifying that it should be joined to another message to form a continuous message.

A receiver for carrying out the method in accordance with the invention is provided, inter alia with a register for storing a received message, a message memory for storing the same message received at another time, and a combination logic for putting together a final version of the message. In a development of the invention where the message memory is expanded for storing a plurality of received messages, the receiver is provided with an ID register for the identity code of the messages, and also a block counter.

BRIEF DESCRIPTION OF DRAWINGS

In the following text there is described an illustrative implementation of a method and a receiver in accordance with the invention, with reference to the accompanying drawing in which.

BEST MODE FOR CARRYING OUT THE INVENTION

In the method provided in accordance with the invention for receiving messages sent by radio, preferably with a receiver for personnel location, there is included receiving the radio transmission and detecting coded characters included therewith. The message is divided into blocks, each of which contains a plurality of characters and added control characters, which enable an error in the transmission of the characters to be indicated or to a certain extent corrected. An introductory block contains an address to the receiver. Only the receiver in which its own address is read from the message will be opened for receiving the message in question. Further included in the method are the steps of storing the received message in a memory, sending a signal, acoustic or otherwise, when a message has been stored, and displaying the latest received message in a display window of the receiver. Furthermore, there may be included depressing an operating button to select which of the stored messages is to be presented in the display window.

What has been said so far is already known, e.g. from Patent Application Ser. No. O-B2101779A mentioned above. The method of organizing the message in blocks, and coding it is mentioned in the cited POCSAG report. The radio transmission is modulated with binary digits and, when letter characters are included in the message they are coded with ASCII code, each block containing three letters. Other, optional codes are used in alternative embodiments.

It is a characteristic of the method provided in accordance with the invention that it includes the added procedural steps of storing the received characters with retained division into blocks, and storing an error indication together with each block if a check has shown that the block contains some incorrectly received character. Further included is selecting corresponding blocks one at a time from a message and from a second reception of the same message, and composing a final version of the message by selecting the one in a pair of blocks which lacks error indication as well as storing the final version of the message for showing in the display window.

Figure 1:
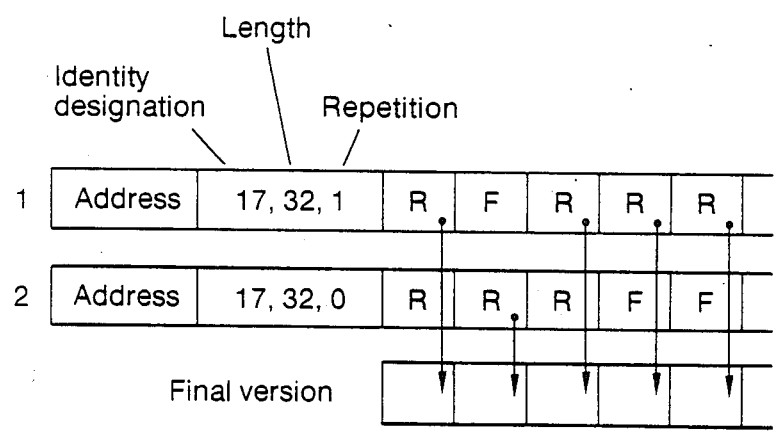
FIG. 1 is a diagram of different versions of a received message.

The method is illustrated by the diagram in FIG. 1. The message 1 contains an address and some numerals, the significance of which will be described later on, after which there follows a number of blocks denoted by R for correctly received blocks and F for incorrectly received ones. The second time the same message is received, errors in the reception may have occurred in blocks other than than those already burdened with errors in the first transmission. The final version of the message is, as illustrated by the arrows in the Figure, combined by selecting the block in a pair of blocks which has been correctly transmitted. If both blocks in a pair are incorrect, one of them is selected anyway, to be included in the final version of the message; the message can generally be interpreted in spite of its containing a few errors. The method also includes pointing out the characters in an incorrect group, e.g. by a blinking light to warn of the incorrectness.

The receiver is often provided with a memory for storing a plurality of received messages, and in order that correct messages shall be put beside each other for combining into a final version, there is included in the method that an identity code is inserted in the introductory block of the message, see FIG. 1, and that for this combination two messages are selected which are marked with the same identity code.

In the case where the message is already established as being error-free the first time it is sent, it will be immediately nominated as the final version of the message and will be stored, a signal being sent as a sign that a new message is available for reading. When the same message is received again, it will be ignored.

Up to now it has been assumed that the message is received twice in the receiver, but in alternative embodiments the message may be received more than twice, e.g. three times. In the illustrated embodiment of the invention, there is included reading a code denoted "repetition" in FIG. 1, and combining the final version of the message, when it has been received as many times as has been decided in the specified method. It is suitably stated how many repetitions of the message there are left; the repetition being terminated when the number has been counted down to zero. The code for repetition can be utilized when the message is only intended to be received twice.

The inventive method further includes reading a code included in the introductory block, see "length" in FIG. 1, and interrupting the reception of the message and storing it when as many blocks as have been specified in the introductory block have been received. In an alternative method, all the messages include an equal number of blocks, e.g. 40 blocks, and information on the number of blocks is then superfluous.

Information on the length of the message, whether it is stated in the introduction to the message or determined as standard, considerably improves the possibility of interpreting the message. For example, in the mentioned POCSAG code, each block may be an address block or an information block, the first bit of the block stating which it is. If the first bit of a message block should be incorrectly understood, the block is interpreted as a new address and that the started message has been terminated. The information on the length of the message makes it possible to neglect the first bit in the message block in this case, and even so to receive a complete message.

In the case where the information which is to be transmitted is so extensive that it is not contained in a single message, the method includes dividing the information into several consecutive messages and to mark each one of them with a code signifying that it is a partial message in a longer, continuous message.

The method set forth herein for receiving messages is primarily applicable to reception of messages in a personnel locator, but may also be used in other receivers for one-way communication, where it is not possible to effect from the receiver the transmission of the message by the transmitter.

Figure 2:
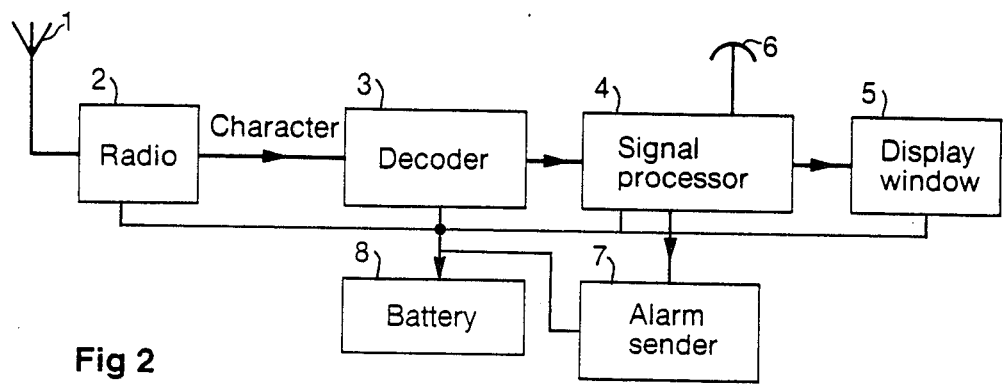
FIG. 2 is a block diagram depicting the main parts of the receiver of the invention.

In the receiver for carrying out the method in accordance with the invention there are included, as illustrated in FIG. 2, a reception aerial 1, a radio reception part 2 connected to the aerial, with, inter alia, a demodulator for feeding out the characters of the message, a decoder 3 attached to the radio part and adapted for, inter alia, reading the characters stating the address of the receiver and opening remaining circuits for reception when the device's own address has been received. There is further included a signal processor 4 for controlling presentation of the received message in an associated display window 5. For reproducing a desired message in the display window there is a pushbutton 6 connected to the signal processor. For stating that a new message is available for showing there is further included an acoustic-type alarm sender 7 connected to the signal processor although another type (e.g., a vibrator or a lamp) may be used in alternative receivers.

A battery 8 for current supply to the different electrical circuits of the receiver is included therein.

Figure 3:
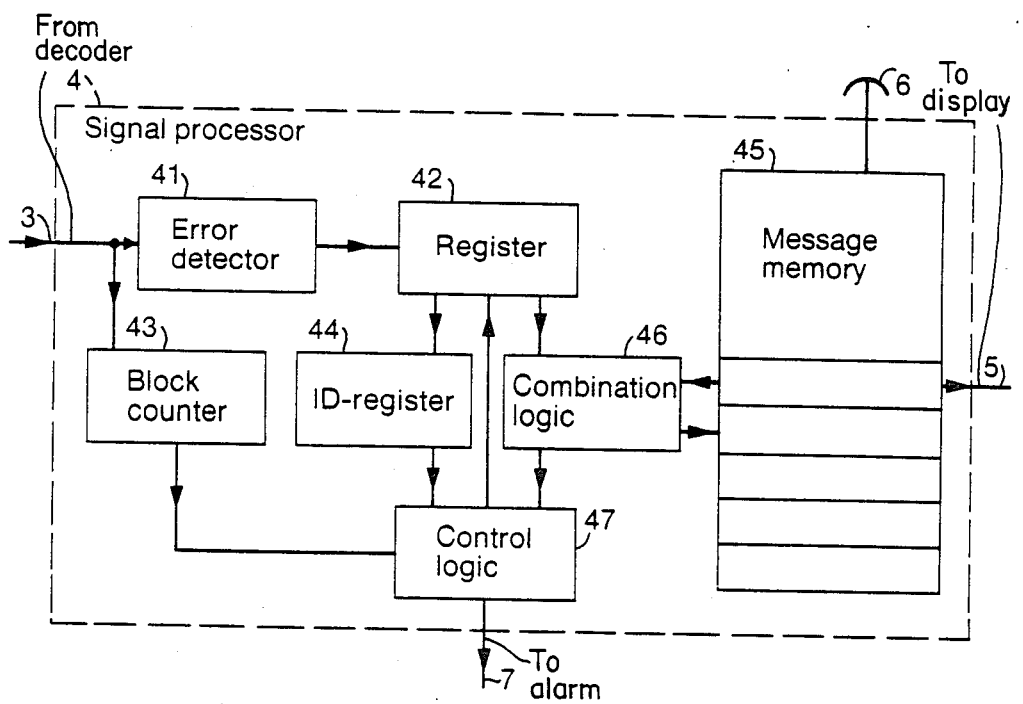
FIG. 3 is a detailed block diagram of one of the receiver's main parts.

The signal processor 4 may be regarded as the heart of the receiver, and it is therefore described in more detail below in connection with FIG. 3. The signal processor 4 includes an error detector 41, adapted to receive characters in a block in the message from the decoder 3, to check whether the block contains any incorrectly received character and to send the character further in appropriate cases with a marking signifying that the block contains an error.

Also included in the signal processor 4 is a register 42 adapted for receiving the signs in a block in the message from the error detector 41 and for temporarily storing the characters in the block together with information on errors therein. The register is adapted for temporarily storing all the blocks in a message. A block counter 43 is adapted to scan the incoming message and count the blocks therein as they are received. An ID register 44, connected to the register 42, is adapted to store identity codes in all the messages stored in the receiver.

A message memory 45 is adapted to store a plurality of received messages. A message which is to be stored is either the one received for the first time or the final version of the message, which has been combined from the first received message and the second similarly worded message. The message memory is adapted such that when a new message is to be stored and the message memory is full, the first-stored message will be erased. The message memory 45 is adapted to feed out an optional message for presentation in the display window 5 on operation of the button 6.

Both register 42 and message memory 45 are adapted for storing the identity code together with the message. A combination logic 46 is connected to the register 42 and the message memory 45, and is adapted to receive blocks from the message in register 42 and to receive from and give out blocks from the message to the message memory 45.

A control logic 47 is connected to the register 42, the block counter 43, ID register 44 and combination logic 46 and is adapted to receive signals from the block counter 43 with information as to the number of blocks in the latest received message and to compare with information in the introductory block as to the number of blocks. Control logic 47 also receives identity code information from the ID register 44 and compares it with information in the identity code in the message in the register 42 and in all messages in the message memory 45. It also receives information from the combination logic 46 concerning received messages. On the basis of these, it gives control signals to the register 42 and thence to combination logic 46, concerning the combination of the final version of the received message in a way described hereinbefore and concerning storing the final version in the message memory. The control logic 47 is also adapted to control sending an alarm signal to the alarm sender 7.

Both the radio part in the receiver and the described logic circuits are made from integrated circutis known in the prior art and therefore do not require any closer description. All the described components are accommodated in a small, easily wearable apparatus which is suitable for use as a personnel locator.

What is claimed is:

1. In a method of receiving messges sent by radio transmission in the form of coded characters, combined into a plurality of blocks together with control characters associated with each block, in which method there are included the procedural steps of: receiving the radio transmission and detecting the characters, storing the messages and showing the messages in a display window, the improvement comprising storing the characters in blocks, investigating whether a block contains an incorrectly received character, and, if so, storing in a message memory an error indication together with the associated block, further receiving at least one repetition of each message and storing the same in a register, combining a final version of the message from the blocks associated with the stored messages, which blocks contain the least numbers of errors and storing the final version of the message for presentation in the display window, said improvement further cimprising simultaneously storing a plurality of messages in said message memory and identifying a repeated message as a repeated message by sensing an identity code transmitted in the repeated message, and combining the final version of the message from the stored messages which have like identity codes.

2. A method as claimed in claim 1 comprising selectively combining the blocks of a message with the blocks of a preceding message based on condition that the latest received message contains a character indicating that the latest received message is a repetition of the preceding message.

3. A method as claimed in claim 1 comprising terminating the reception of a message only after the reception of a number of blocks indicated in the message.

4. A method as claimed in claim comprising including in a message, which is to be connected to another message a character indicating that the message should be connected to another message to form a continuous message.

5. A receiver for receiving messages sent by radio transmission in the form of coded characters comprising a receiver aerial (1), a radio means (2) adpated for reception of radio signals and including a demodulator for processing received characters, decoder means (3) connected to the radio means and adapted for detecting the receiver's address in the received characters, a signal processor means (4) connected to the decoder means (3) and including a message memory (45) for storing a plurality of messages received from the decoder means, each message being constituted by a plurality of blocks with characters received block by block and a register (42) for storing the same message received at a later time, said receiver further comprising an error detector means (41) in the signal processor means (4), said error detector means being connected to said decoder means for detecting errors in the characters in a received block on the basis of control characters included in said block said register further being adapted to store the characters of the received blocks and to store an indication as to errors in the received blocks, and a combination logic means (46) for combining a final version of a message from associated blocks from an associated message stored in the register (42) and from an associated message stored in the message memory (45), such that the selection of blocks is based on determining the blocks including the least errors, and an ID register means (44) for storing an identity code of the received messages and controlling combination of corresponding messages stored in the register (42) and message memory (45) based on identity of the identity codes.

6. A receiver as claimed in claim 5 comprising a block counter (43), adapted for counting the number of blocks in a received message and for providing information on the number of blocks to the combination logic means (46) for comparing with information inserted in the message as to the number of blocks in the message.

* * * * *